US011119767B1

(12) United States Patent
Mestan et al.

(10) Patent No.: US 11,119,767 B1
(45) Date of Patent: Sep. 14, 2021

(54) ATOMIC OPERATION PREDICTOR TO PREDICT IF AN ATOMIC OPERATION WILL SUCCESSFULLY COMPLETE AND A STORE QUEUE TO SELECTIVELY FORWARD DATA BASED ON THE PREDICTOR

(71) Applicant: Apple Inc., Cupertino, CA (US)

(72) Inventors: Brian R. Mestan, Austin, TX (US); Gideon N. Levinsky, Cedar Park, TX (US); Michael L. Karm, Cedar Park, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/906,396

(22) Filed: Jun. 19, 2020

(51) Int. Cl.
*G06F 9/30* (2018.01)
*G06F 9/38* (2018.01)
*G06F 9/32* (2018.01)
*G06F 9/52* (2006.01)

(52) U.S. Cl.
CPC ........ *G06F 9/30043* (2013.01); *G06F 9/3004* (2013.01); *G06F 9/30087* (2013.01); *G06F 9/321* (2013.01); *G06F 9/3826* (2013.01); *G06F 9/3834* (2013.01); *G06F 9/3842* (2013.01); *G06F 9/528* (2013.01); *G06F 2209/521* (2013.01)

(58) Field of Classification Search
CPC .. G06F 9/3004; G06F 9/30087; G06F 9/3826; G06F 9/3834; G06F 9/3842; G06F 9/528; G06F 2209/521
See application file for complete search history.

(56) References Cited

U.S. PATENT DOCUMENTS

| 6,282,637 | B1 | 8/2001 | Chan et al. |
| 7,529,914 | B2 | 5/2009 | Saha et al. |
| 8,533,436 | B2 | 9/2013 | Fryman et al. |
| 9,250,914 | B2* | 2/2016 | Hughes ................... G06F 15/80 |
| 10,437,595 | B1* | 10/2019 | Kanapathipillai .. G06F 9/30021 |
| 2014/0006685 | A1 | 1/2014 | Peterson et al. |
| 2014/0237159 | A9 | 8/2014 | Flynn et al. |
| 2017/0286113 | A1* | 10/2017 | Shanbhogue ....... G06F 9/30043 |
| 2018/0081686 | A1* | 3/2018 | Ho ...................... G06F 9/30043 |
| 2019/0205244 | A1 | 7/2019 | Smith |

* cited by examiner

*Primary Examiner* — Jacob Petranek
(74) *Attorney, Agent, or Firm* — Kowert, Hood, Munyon, Rankin & Goetzel, P.C.; Lawrence J. Merkel

(57) ABSTRACT

In an embodiment, a processor comprises an atomic predictor circuit to predict whether or not an atomic operation will complete successfully. The prediction may be used when a subsequent load operation to the same memory location as the atomic operation is executed, to determine whether or not to forward store data from the atomic operation to the subsequent load operation. If the prediction is successful, the store data may be forwarded. If the prediction is unsuccessful, the store data may not be forwarded. In cases where an atomic operation has been failing (not successfully performing the store operation), the prediction may prevent the forwarding of the store data and thus may prevent a subsequent flush of the load.

20 Claims, 9 Drawing Sheets

Computer Accessible Storage Medium 200

SOC
204

FIG. 8

ATOMIC OPERATION PREDICTOR TO PREDICT IF AN ATOMIC OPERATION WILL SUCCESSFULLY COMPLETE AND A STORE QUEUE TO SELECTIVELY FORWARD DATA BASED ON THE PREDICTOR

BACKGROUND

Technical Field

Embodiments described herein are related to processors and, more particularly, to performing atomic operations in processors.

Description of the Related Art

A processor executes instructions defined in an instruction set architecture (ISA) that is implemented by the processor. The ISA defines the coding of each instruction (e.g., how the instruction appears in memory), the operation of the instruction, and the resulting updates to architectural state. One type of instruction or instructions that is often included in the ISA is an atomic instruction. The atomic instruction generally includes a load from a memory location, a data operation on the load data, and a store operation to write the memory location. The store operation can be conditional based on the result of the data operation. For example, a compare and swap atomic instruction compares the load data to data in another register operand of the instruction and, if the comparison result is equal, the store is performed. If the comparison result is not equal, the store is not performed. Another example is a test and set instruction, which tests the load data for a predetermined value (e.g. zero) and writes another value (e.g. one) to the location if the predetermined value is in the memory location. A test and clear instruction can be supported as well, that tests for one and writes zero. Still other examples perform arithmetic operations on the load data and write the result as the store data. Additionally, as implied by the name, the atomic instruction is defined to perform the load and the store atomically with respect to other memory operations. Another processor (or any other memory-writing agent) is not permitted to update the memory location between the load and the store.

Since the store is conditional based on the result of the data operation, a subsequent load operation to the memory location that is executed by the processor (e.g., a load operation derived from an instruction that is after the atomic instruction in program order) should either receive the data written by the store operation (if the store is performed) or the data that was in the memory location prior to execution of the atomic instruction (if the store is not performed). Most atomic instruction execute successfully, performing the update. Accordingly, some processors are designed to forward the data from the store speculatively for the subsequent load operation to improve performance. If the atomic instruction is later found to have failed (e.g. the store is not performed), the processor is flushed at the subsequent load operation and the corresponding instructions are refetched. However, there are some code sequences in which an atomic instruction is biased to fail (e.g. the atomic instruction is more likely to fail, not performing the store, than to succeed and perform the store). In such cases, the speculative forwarding and flushing can reduce performance and unnecessarily consume power.

SUMMARY

In an embodiment, a processor comprises an atomic predictor circuit to predict whether or not an atomic operation will complete successfully. The prediction may be used when a subsequent load operation to the same memory location as the atomic operation is executed, to determine whether or not to forward the store data (that is, the data to be written to the memory location in the event that the atomic operation is successful). If the prediction is successful, the store data may be forwarded. If the prediction is unsuccessful, the store data may not be forwarded. In cases where an atomic operation has been failing (not successfully performing the store operation), the prediction may prevent the forwarding of the store data and thus may prevent a subsequent flush of the load.

BRIEF DESCRIPTION OF THE DRAWINGS

The following detailed description refers to the accompanying drawings, which are now briefly described.

FIG. 8 is a block diagram of one embodiment of a computer accessible storage medium.

Figure 1:
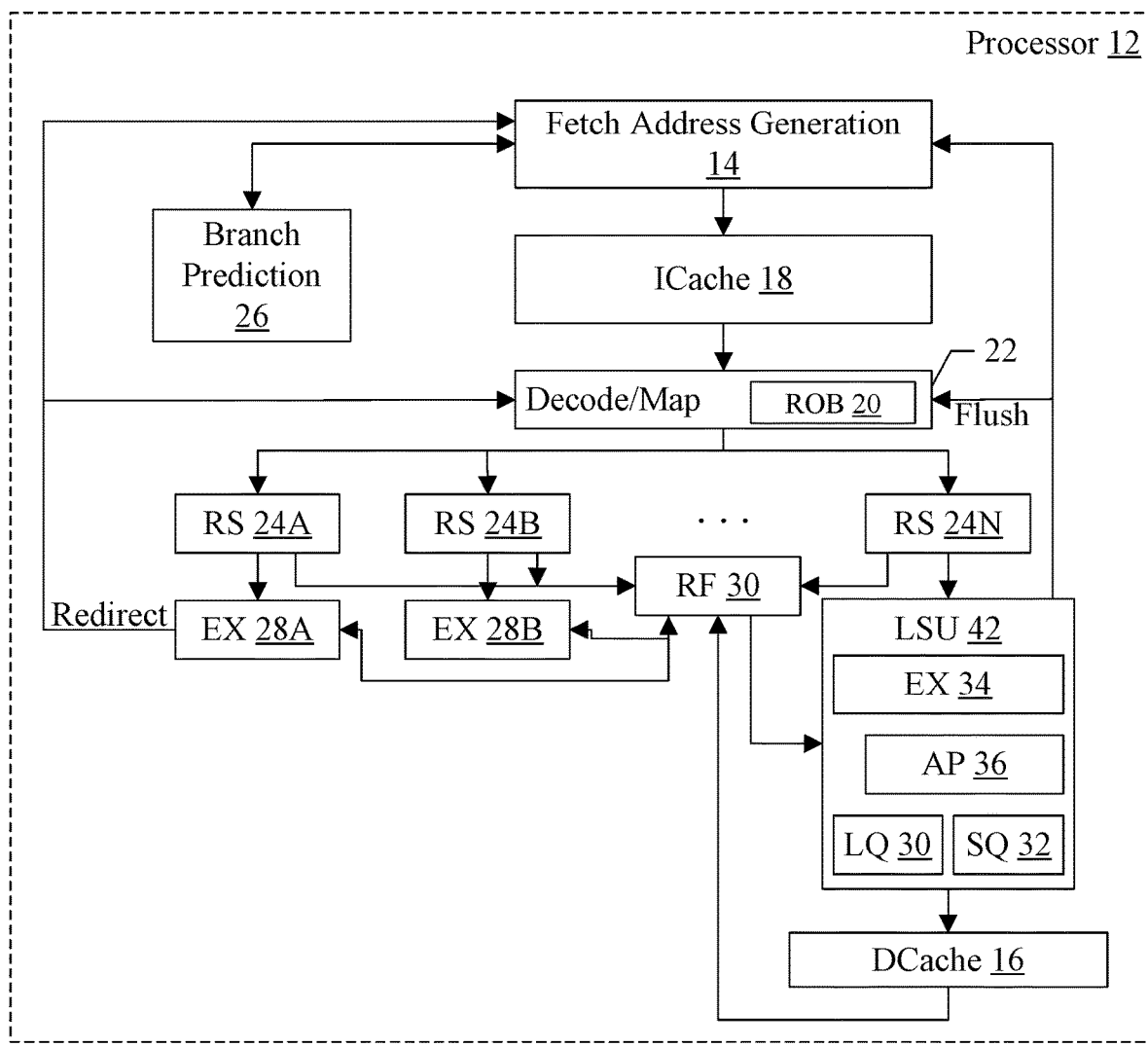
FIG. 1 is a block diagram of one embodiment of a processor.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean "including, but not limited to." As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be said to be "configured" to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Similarly, as used herein, the term "responsive to" or "in response to" is used to describe one or more factors that may contribute to causing a result. This term does not foreclose the possibility that additional factors may affect the causation, either independently or jointly with the specified factors. That is, a result may be solely responsive to the specified factors or responsive to the specified factors and/or other, unspecified factors. Consider the phrase "perform A responsive to B." This phrase specifies that B is a factor in causing A or that affects the causation of A. This phrase does not foreclose that the causation of A may responsive to some other factor, such as C, independent of B or jointly with B. This phrase is also intended to cover an embodiment in which A is caused solely responsive to B. As used herein, the phrase "responsive to" is synonymous with the phrase "responsive at least in part to." Similarly, the phrase "in response to" is synonymous with the phrase "at least in part in response to."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

This specification may use the words "a" or "an" to refer to an element, or "the" to refer to the element. These words are not intended to mean that there is only one instance of the element. There may be more than one in various embodiments. Thus, "a", "an", and "the" should be interpreted to mean "one or more" unless expressly described as only one.

This specification may describe various components, units, circuits, etc. as being coupled. In some embodiments, the components, units, circuits, etc. may be coupled if they are electrically coupled (e.g. directly connected or indirectly connected through one or more other circuits) and/or communicatively coupled.

DETAILED DESCRIPTION OF EMBODIMENTS

Turning now to FIG. 1, a block diagram of one embodiment of a processor 12 is shown. In the illustrated embodiment, the processor 12 includes a fetch address generation circuit 14, an instruction cache ("ICache") 18, a decode/map unit 22 (including a reorder buffer (ROB) 20), a branch prediction unit 26, one or more reservation stations 24A-24N, one or more execution units 28A-28B, a register file 30, a data cache ("DCache") 16, and a load/store unit (LSU) 42. The LSU 42 includes a load queue (LQ) 30, a store queue (SQ) 32, an atomic predictor (AP) circuit 36 coupled to the SQ 32, and an execution circuit 34 coupled to the AP circuit 36, the LQ 30, and the SQ 32.

The fetch address generation circuit 14 is coupled to the ICache 18, which is coupled to the decode/map unit 22, which is coupled to the reservation stations 24A-24N. The reservation stations 24A-24B are coupled to the execution units 28A-28B as shown in FIG. 1, and the reservation station 24N is coupled to the LSU 42. The reservation stations 24A-24N are also coupled to the register file 30, which is coupled to the execution units 28A-28B and the LSU 42. The LSU 42 is also coupled to the DCache 16, which is coupled to the register file 30. The branch prediction unit 26 is coupled to the fetch address generation circuit 14. One or more of the execution units 28A-28B may be configured to provide a redirect to the fetch address generation circuit 14 and the decode/map unit 22 (e.g. in the event of a branch misprediction or other microarchitectural exception, in an embodiment). The LSU 42 may provide a flush indication to the fetch address generation circuit 14 and the decode/map unit 22 in the illustrated embodiment. Alternatively, the flush indication may be provided to the decode/map unit 22, which may flush the ops after the flush point and provide a refetch address to the fetch address generation circuit 14.

The fetch address generation circuit 14 may be configured to generate fetch addresses (fetch PCs) to fetch instructions from the ICache 18 for execution by the processor 12. The fetch address generation circuit 14 may implement various prediction structures to predict the fetch path. For example, a next fetch predictor may be used to predict fetch addresses based on previously executed instructions. In such an embodiment, the branch prediction unit 26 may be used to verify the next fetch prediction. Alternatively, the branch prediction unit 26 may be used to predict next fetch addresses if the next fetch predictor is not used.

The branch prediction unit 26 may include one or more branch predictors such as a branch direction predictor, an indirect branch predictor, and a return address stack predictor. Various embodiments may include any subset of the above branch predictors and/or other predictors. The branch direction predictor may be configured to predict the taken/not taken result for conditional branches. Based on the taken/not taken result, the next fetch address may be either the branch target address or the next sequential address. The branch target address may be the address specified by the branch instruction (or more briefly, branch) to which fetching is to be directed when the branch is taken (or is always the location to which fetching is to be directed, for unconditional branches). The next sequential address may be the address that numerically follows the PC of the branch, and may be the next fetch address if the branch is not taken (similar to non-branch instructions, which are fetched in sequential order). The return address stack may predict the fetch addresses for return instructions, based on previous call instructions. The call and return instructions may be used, e.g. to call and return from subroutines/functions, etc. The call instruction may push a return address on the stack (e.g. to the next sequential instruction after the call), and the return instruction may pop the top of the stack to generate the return address. The stack may be in memory, or may be simulated via a register written by the call instruction and read by the return instruction. The indirect branch predictor may predict the target address of an indirect branch instruction. In an embodiment, the indirect branch predictor may be a Tagged Geometric (TAGE)-style branch predictor which has multiple memories. A base memory may be indexed by the PC or a hash of the PC, and other memories may be indexed by the PC hashed with different amounts of branch history. The base memory may not be tagged, but the other memories may be tagged. If a tag hit is detected in one or more of the other memories, the branch target address may be predicted to be the target address from the memory that is indexed with the largest amount of history and that is also a tag hit for the branch. If no tag hit is detected, the branch target address may be predicted to be the target address from the base memory. Other embodiments may implement other types of indirect branch predictors. For example, a single table indexed by branch PC and branch history, or simply branch PC, may be used. A single tagged table may be used.

The decode/map unit 22 may be configured to decode the fetched instructions from the ICache 18 into instruction operations. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 12 may be decoded into a single instruction operation, and thus the term "instruction operation" may be essentially synonymous with "instruction" in such embodiments (although it may be modified in form by the decoder). The term "instruction operation" may be more briefly referred to herein as "operation" or "op."

The decode/map unit 22 may be configured to map the ops to speculative resources (e.g. physical registers) to permit out-of-order and/or speculative execution, and may dispatch the ops to the reservation stations 24A-24N. The ops may be mapped to physical registers in the register file 30 from the architectural registers used in the corresponding instructions. That is, the register file 30 may implement a set of physical registers that may be greater in number than the architected registers specified by the instruction set architecture implemented by the processor 12. The decode/map unit 22 may manage the mapping of the architected registers to physical registers. There may be separate physical registers for different operand types (e.g. integer, vector, floating point, etc.) in an embodiment. In other embodiments, the physical registers may be shared over operand types. The decode/map unit 22 may also be responsible for tracking the speculative execution and retiring ops or flushing misspeculated ops. The ROB 20 may be used to track the program order of ops and manage retirement/flush, for example.

Ops may be scheduled for execution when the source operands for the ops are ready. In the illustrated embodiment, decentralized scheduling is used for each of the execution units 28A-28B and the LSU 42, e.g. in the reservation stations 24A-24N. Other embodiments may implement a centralized scheduler if desired. Scheduled ops may read their source operands from the register file 30 and/or may have operands forwarded from previous ops executed by the execution units 28A-28B and/or LSU 42. The results of ops that have target registers may be written to the register file 30 and/or forwarded to dependent ops.

The reservation station 24N may also be configured to issue atomic operations (or at least the load op and store op derived from a given atomic operation) to the LSU 42 for execution. The load op may be issued before the store op, since it is known that the load op reads the memory location before the store op writes the memory location. Alternatively, the load op and store op may be issued concurrently, and load/store ordering checks in the LSU 42 may ensure the order of the load op and the store op.

The LSU 42 may be configured to execute load/store memory ops. Generally, a memory operation (memory op) may be an instruction operation that specifies an access to memory (although the memory access may be completed in a cache such as the data cache 16). A load memory operation may specify a transfer of data from a memory location to a register (e.g. a "read"), while a store memory operation may specify a transfer of data from a register to a memory location (e.g. a "write"). Load memory operations may be referred to as load memory ops, load ops, or loads; and store memory operations may be referred to as store memory ops, store ops, or stores. In an embodiment, store ops may be executed as a store address op and a store data op. The store address op may be defined to generate the address of the store, to probe the cache for an initial hit/miss determination, and to update the store queue 32 with the address and cache info. Thus, the store address op may have the address operands as source operands. The store data op may be defined to deliver the store data to the store queue. Thus, the store data op may not have the address operands as source operands, but may have the store data operand as a source operand. In many cases, the address operands of a store may be available before the store data operand, and thus the address may be determined and made available earlier than the store data. In some embodiments, it may be possible for the store data op to be executed before the corresponding store address op, e.g. if the store data operand is provided before one or more of the store address operands. While store ops may be executed as store address and store data ops in some embodiments, other embodiments may not implement the store address/store data split.

The execution circuit 34 in the LSU 42 may execute the load/store ops issued by the reservation station 24N. The execution circuit 34 may access the data cache 16 to determine hit/miss for the load/store ops, and to forward data for loads. The execution circuit 34 may check the store queue 32 for ordering issues with loads being executed, as well as to forward data from a store or stores in the store queue 32 for a load that is younger than the store or stores and matches the address of the store(s) in the store queue 32. Similarly, the execution circuit 34 may check the load queue 30 to detect ordering issues for a store being executed. When ordering issues are detected, if the op being executed is the op that needs to finish later than an op in one of the queues 30-32, an internal retry of the op may be used to properly order the ops. If the op in the queue 30-32 needs to finish later than an op that is being executed, a flush is often needed (e.g. if a load has forwarded data and is in the load queue 30, and an older store executes and updates the same data or a portion of the data, then incorrect data has been forwarded).

The LSU 42 may also be configured to execute at least the load op and the store op that are part of an atomic instruction/operation. In some embodiments, the LSU 42 may also execute the data operation on the load data. For example, for a compare and swap atomic operation, the data operation is a comparison and may be implemented by including a comparator in the LSU 42 (or sharing one of the other comparators used, e.g. for address comparisons). In other embodiments, the data operation may be performed in the execution units 28A-28B. For example, a more complex arithmetic operation such as an add and compare or the like may be implemented in the execution units 28A-28B.

In general, the atomic operation may comprise or specify a load operation from a memory location, a data operation on first data from the load operation (the "load data"), and a store operation to write second data (the "store data") to the memory location. The store operation may be conditional based on a result of the data operation. That is, the write to the memory location of the second data may be performed, or occur, conditionally based on the result of the data operation. The atomic operation is defined to complete unsuccessfully based on the store operation/write not being performed, and to complete successfully based on the store operation/write being performed.

For example, a compare and swap atomic operation may compare the load data to an operand of the compare and swap instruction. If the comparison is equal, the store data is written to the memory location, completing successfully. If the comparison is not equal, the store data is not written to the memory location, completing unsuccessfully. Test and set/clear operations may test for a predetermined value in the load data (e.g. zero for test and set, one for test and clear) and perform the store data write if the comparison is equal or not perform the store data write if the comparison is not equal. An arithmetic result may also be compared to an operand or a predefined value (e.g. zero) to produce the condition for the store operation. Alternatively, condition codes describing the arithmetic result may produce the condition (e.g. carry, overflow, negative, zero, etc.).

The source of the second data for the store operation may vary based on the definition of the atomic operation. In some cases, the second data may be an operand of the atomic instruction. For example, a compare and swap instruction may include an operand specifying the second data to be conditionally written (e.g. a register address of the register containing the data). In other cases, the second data may be a predetermined value implicit in the definition of the instruction. For example, a test and set or test and clear instruction may implicitly specify a one or zero, respectively, as the predetermined value. In still other cases, the second data may be the result of the data operation (e.g. in the case of an arithmetic operation performed on the load data).

The atomic predictor circuit 36 may be configured to predict the success or lack of success of an atomic operation (e.g. whether or not the atomic operation will complete successfully or complete unsuccessfully). The prediction may also be referred to as a pass/fail prediction. For example, a pass prediction may be a prediction that the atomic operation will complete successfully, and a fail prediction may be a prediction that the atomic operation will complete unsuccessfully. The atomic predictor circuit 36 may track the execution of previous atomic operations to generate the prediction. In various embodiments, the atomic predictor circuit 36 may track the execution of previous atomic operations globally, or may track atomic operations separately based on a differentiation of the atomic operations. For example, the fetch address of the atomic operations may be a factor in the differentiation (e.g. hashed to form the index, or used directly as an index to a predictor memory). Operands or operand identifiers of the atomic operation (e.g. register addresses or the values provided from the registers) may be a factor in the differentiation. Any combination of factors may be used as differentiators in various embodiments.

In an embodiment, the atomic predictor circuit 36 may base the prediction on additional factors such as the value of one or more operands. For example, for a compare and swap atomic operation, the value to be compared to the load data may be a factor in the prediction. If the value is zero or one, for example, it may be more likely to pass than if the value is another value (which might be a counter or other value that is being approached through multiple iterations). The type of atomic operation may be a factor as well (e.g. there may be multiple forms of the compare and swap instruction, and some forms may be more likely to pass than others).

The store queue 32 may queue store ops that have been executed (e.g. probed the cache) and are awaiting commit (e.g. once a given store op is retired, or ready to be retired, in various embodiments). Generally, a store may be committed when the processor 12 has at least determined that the store is guaranteed to update the target memory location (e.g. the store cannot be flushed due to an interrupt, architected fault or exception, or microarchitectural exception). In an embodiment, a store may be committed when the store is retired by the processor 12. The LSU 42/execution circuit 34 may forward data from the store queue 32 for younger load ops. In the case that the store has an address matching the load address but does not have data available, the LSU 42/execution circuit 34 may retry the load based on the store queue 32 match and wait for store data to become available. The store queue 32 may also be used to detect ordering issues with loads.

The store queue 32 may also store an indication of the prediction from the atomic predictor circuit 36 with the store op that is part of the atomic operation. The forwarding of the store data for a subsequent load operation to the same memory location, or younger load operation, may be based on the prediction as well as the address matching. If the prediction is successful completion (or pass), the store queue 32 may forward the store data for the subsequent load operation. If the prediction is unsuccessful completion (or fail), the store queue 32 may prevent the forwarding even though the addresses match and the store data is available in the store queue 32. For example, the load may be retried and may be stalled in the load queue 30 until at least the store operation is removed from the store queue 32 (e.g. due to commit or due to the store operation completing unsuccessfully). In an embodiment, the load may be stalled until all older store operations are drained from the store queue. In another embodiment, the load may be tagged with the store queue entry and may be replayed when the store queue entry is freed. In still another embodiment, the load may be replayed, and may be retried on each replay until it does not hit in the store queue 32 any longer.

In an embodiment, the prediction may also be used to affect the cache state in the DCache 16 for the cache line accessed by an atomic op. If an atomic op completes successfully, the store will write the DCache 16. Accordingly, when an atomic op executes, the processor 12 may attempt to obtain an exclusive state of the cache line (e.g. exclusive may be requested for a cache miss, or a change from shared to exclusive state may be requested for a cache hit in the shared state). When the store is performed successfully, the cache line may be updated without further communication. However, if the atomic op is predicted to be unsuccessful, the exclusive state may not be needed and may reduce performance overall in the system if there is contention for the cache line. Thus, the processor 12 may attempt to obtain a shared state for the cache line (e.g. the cache line may be requested in shared state for a cache miss, or may remain in shared state for a cache hit), when an atomic op is predicted to be unsuccessful.

In an embodiment, the prediction may also be used to affect other parts of the processor 12. For example, if the result of the atomic op affects a subsequent compare branch, the branch prediction may be more likely to be incorrect. The prediction may be used to throttle the upstream pipeline stages of the processor 12 to save power, since a misprediction causes a flush of the processor 12. An embodiment may even use the atomic op prediction in the branch prediction unit 26 as well (e.g. the branch prediction unit 26 may use the atomic op prediction of unsuccessful (store op will not write the memory location) in a subsequent branch prediction.

Similarly, the load queue 30 may queue load ops that have been executed. The load queue 30 may include load ops that have been retried and are to be executed again, either as soon as possible or after occurrence of a subsequent event related to the reason that the retry was detected. The load queue 30 may also be used by the LSU 42 to detect ordering issues with stores, so that loads that have completed (e.g. irreversibly forwarded data to a target) and have an ordering issue may be flushed. The ordering issues detected using the load queue 30 and the store queue 32 may include memory ordering model issues and/or issues related to the coherence of memory locations that are read by load ops and written by store ops in the same thread or code sequence being executed by the processor 12.

The execution units 28A-28B may include any types of execution units in various embodiments. For example, the execution units 28A-28B may include integer, floating point, and/or vector execution units. Integer execution units may be configured to execute integer ops. Generally, an integer op is an op which performs a defined operation (e.g. arithmetic, logical, shift/rotate, etc.) on integer operands. Integers may be numeric values in which each value corresponds to a mathematical integer. The integer execution units may include branch processing hardware to process branch ops, or there may be separate branch execution units.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g. base 2, in an embodiment).

Vector execution units may be configured to execute vector ops. Vector processing may be characterized by performing the same processing on significant amounts of data, where each datum is a relatively small value (e.g. 8 bits or 16 bits, compared to 32 bits to 64 bits for an integer). Thus, vector ops often include single instruction-multiple data (SIMD) or vector operations on an operand that represents multiple data items.

Thus, each execution unit 28A-28B may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit may be an independent pipe for executing ops. Different execution units may have different execution latencies (e.g., different pipe lengths). Additionally, different execution units may have different latencies to the pipeline stage at which bypass occurs, and thus the clock cycles at which speculative scheduling of dependent ops occurs may vary based on the type of op and execution unit 28 that will be executing the op.

It is noted that any number and type of execution units 28A-28B may be included in various embodiments, including embodiments having one execution unit and embodiments having multiple execution units. Similarly, there may be more than one LSU 42.

A cache line may be the unit of allocation/deallocation in a cache. That is, the data within the cache line may be allocated/deallocated in the cache as a unit. Cache lines may vary in size (e.g. 32 bytes, 64 bytes, 128 bytes, or larger or smaller cache lines). Different caches may have different cache line sizes. The ICache 18 and DCache 16 may each be a cache having any desired capacity, cache line size, and configuration. There may be more additional levels of cache between the DCache 16/ICache 18 and the main memory, in various embodiments.

At various points, ops are referred to as being younger or older than other ops. A first operation may be younger than a second operation if the first operation is subsequent to the second operation in program order. Similarly, a first operation may be older than a second operation if the first operation precedes the second operation in program order.

Figure 2:
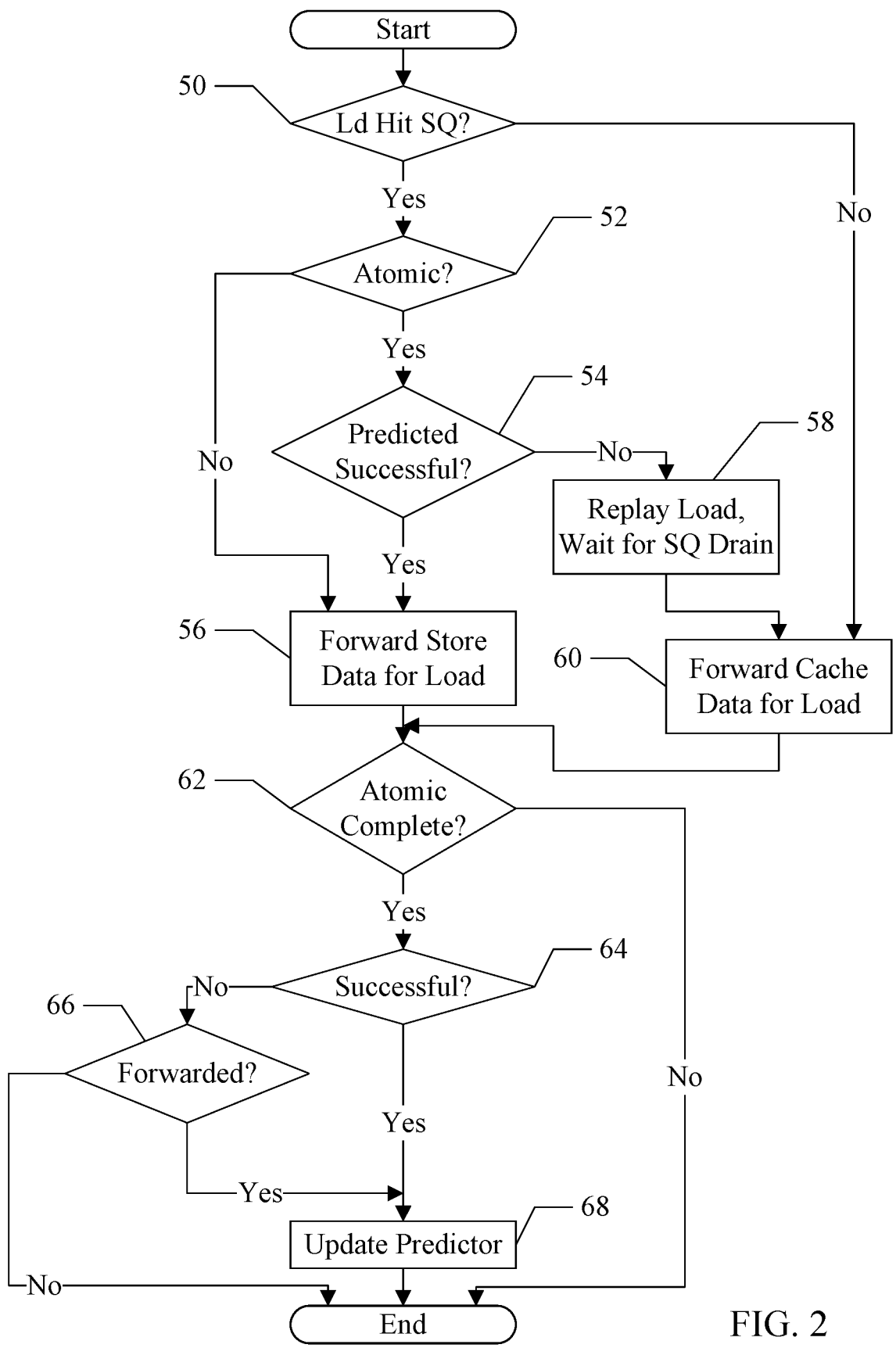
FIG. 2 is a flowchart illustrating certain operations of one embodiment of the processor shown in FIG. 1.

FIG. 2 is a flowchart illustrating certain operations of one embodiment of the processor 12 (and portions thereof). While the blocks are shown in a particular order for ease of understanding, other orders may be used. Some blocks or combinations of blocks may be independent of each other and thus may be performed in parallel or in any order. For example, in FIG. 2, the combination of the blocks 62, 64, 66, and 68 may be independent of the combination of the blocks 50, 52, 54, 56, 58, and 60. Blocks may be performed in parallel in combinatorial logic in the processor 12. Blocks, combinations of blocks, and/or the flowchart as a whole may be pipelined over multiple clock cycles. The processor 12 may be configured to implement the operation shown in FIG. 2.

When the processor 12 (and more particularly the LSU 42) executes a load op, the LSU 42 may compare the address of the data being read by the load to the addresses of data being written by the stores in the store queue 32 to check for a hit. If the load op is a hit on a store op in the store queue 32 (e.g. the addresses match or overlap and the store op is older than the load op) (decision block 50, "yes" leg), it is possible that the store queue 32 will forward data for the load op (or for a portion of the load op, if the processor 12/LSU 42 supports partial store to load forwarding when the addresses overlap but there are bytes not supplied by the store op). In this case, the load op may be a subsequent load op with respect to the store op, since the load op is an instruction, or is derived from an instruction that is younger than the store op's instruction (or the instruction from which the store op is derived, e.g. an atomic op).

If the store op is part of an atomic op (decision block 52, "yes" leg) that is predicted to complete successfully (decision block 54, "yes" leg), the store queue 32 may forward the store data from the store queue 32 as data for the load op (block 56). Also, if the store op is not part of an atomic op (decision block 52, "no" leg), the store queue may forward the store data from the store queue 32 (block 56). On the other hand, if the store op is part of an atomic op (decision block 52, "yes" leg) and the atomic is predicted to complete unsuccessfully (decision block 54, "no" leg), the LSU 42 may retry or replay the load op, and may wait for the store queue 32 to drain of older stores before reattempting the load op (block 58). Viewed in another way, the LSU 42 may prevent the forwarding of data from the store op to the subsequent load op based on the prediction that the atomic op will be completed unsuccessfully, even in the event that the forwarding would otherwise have occurred. That is, the LSU 42 may prevent the forwarding of data from the store op to the subsequent load op based on the prediction that the store operation will not be performed. When the load op is replayed (e.g. after the store operation has been removed from the store queue 32), it may hit the DCache 16 and the load data may be forwarded from the DCache 16 (block 60). If the load op is a miss in the DCache 16, the load data may be forwarded form a different cache level (if a hit) or from main memory (if a miss in all cache levels). Also, if the load op is not hit in the store queue 32 (decision block 50, "no" leg), the data for the load may be forwarded from the DCache 16 or another cache level/main memory (block 60).

As mentioned previously, other embodiments may delay the replayed load until at least the store op associated with the atomic op and that is hit by the replayed load is removed from the store queue 32, rather than waiting for a drain. Alternatively, other embodiments may attempt a replay after any entry is removed from the store queue, or may attempt a replay periodically, instead of implementing the logic to wait for the particular store op that is hit by the load. In still other embodiments, the data that was read from the memory location for the load op from the atomic op may also be captured in the store queue 32 and forwarded for the subsequent load op based on the prediction that the atomic op will complete unsuccessfully. In yet another embodiment, data from the DCache 16 may be forwarded for the subsequent load op, prior to the removal of the store op from the store queue 32, based on the prediction of unsuccessful. Such an embodiment effectively ignores the store queue hit when the prediction is unsuccessful. The data in the DCache 16 would be the same as the data read by the load portion of the atomic op.

Additionally, the processor 12/LSU 42 may determine if an atomic op has completed (decision block 62). The atomic op may be complete if the store op from the atomic op is committed, or the store op is not being performed based on the result of the data operation, or the store op is not being performed because atomicity was not maintained over the affected data between the load op from the atomic op and the store op from the atomic op. In some embodiments, the atomicity is guaranteed (e.g. by inhibiting snoops during the time between the load and the store or between initiation of the store and completion of the store) and the atomic operation may not fail due to lack of atomicity. If the atomic op is completed successfully (decision block 62, "yes" leg and decision block 64, "yes" leg), the atomic predictor circuit 36 may update to reflect the atomic op that has complete successfully. Various embodiments will be described in more detail below as examples of the update. If the atomic op is completed unsuccessfully (decision block 64, "no" leg) and the store op forwarded data for a subsequent load op (decision block 66, "yes" leg), the atomic predictor circuit 36 may update to reflect the atomic op that has completed unsuccessfully (block 68). Again, various embodiments will be described in more detail below as examples of the update for completing unsuccessfully as well as completing successfully. If no atomic op is completing (decision block 62, "no" leg) or the atomic op has completed unsuccessfully but did not forward data for a subsequent load (decision block 62, "yes" leg, decision block 64, "no" leg, and decision block 66, "no" leg), then no update is made in this embodiment. In other embodiments, an atomic op that completes unsuccessfully but has not forwarded data may update the prediction as well. The update for completing unsuccessfully without forwarding may be the same as the update for completing unsuccessfully with forwarding, or may be a lesser-weighted update than the update for completing unsuccessfully with forwarding, in various embodiments.

By updating the prediction if the atomic operation is unsuccessful and forwards the store data, but not updating the prediction if the atomic operation is unsuccessful but did not forward the store data, the prediction may be focused on the cases when flushing actually occurs. That is, if the atomic operation fails but the store data was not forwarded, there is no need to flush any instructions and thus the incorrect prediction may have been harmless to performance and power consumption.

In an embodiment, a thread including an atomic operation may have different phases of execution in which the result of the atomic operation may vary based on the phase. For example, a first phase may include the atomic operation resulting in success (store operation performed), while a second phase may include the atomic operation resulting in failure (store operation not performed). The atomic predictor circuit 36 may train the prediction(s) to adapt to the changes in execution phase. That is, the atomic predictor circuit 36 may strengthen a prediction of successful in the first phase, and weaken a prediction of successful in the second phase (adapting to a prediction of unsuccessful as the second phase continues). Similarly, the atomic predictor circuit 36 may strengthen a prediction of unsuccessful in the second phase, and weaken the prediction of unsuccessful in the first phase (adapting to a prediction of successful as the first phase continues).

Figure 3:
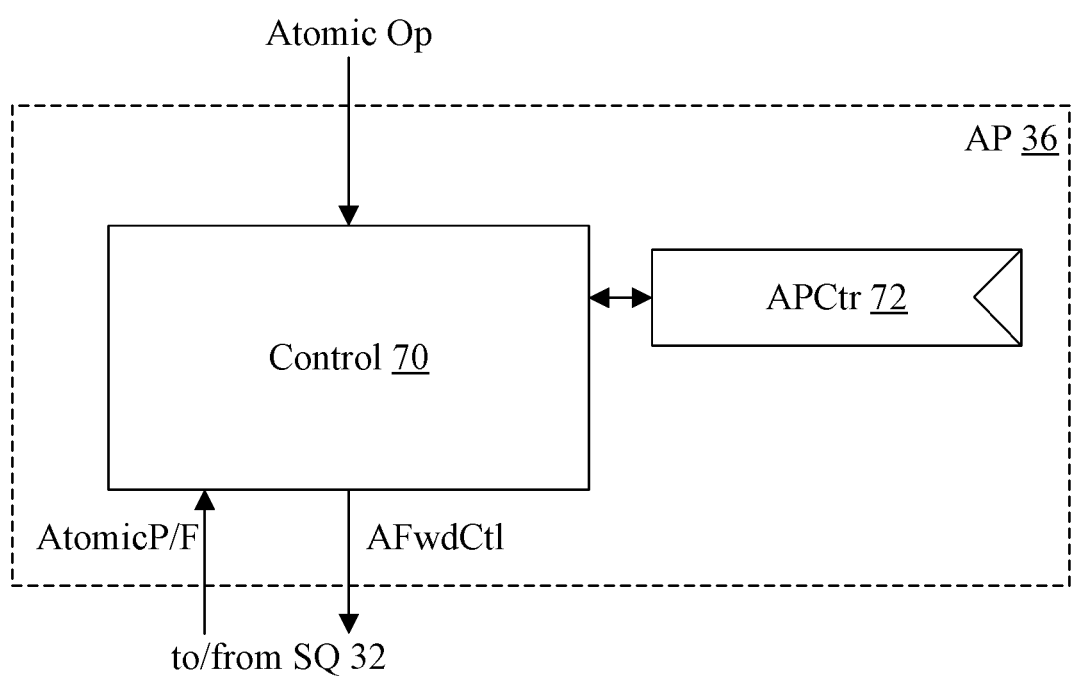
FIG. 3 is a block diagram of one embodiment of an atomic predictor circuit shown in FIG. 1.

FIG. 3 is a block diagram of one embodiment of the atomic predictor circuit 36. In the illustrated embodiment, the atomic predictor circuit 36 comprises a control circuit 70 coupled to a register, or counter, 72. The control circuit 70 is coupled to an indication that an atomic op is being executed (e.g. from the execution circuit 34) and is configured to generate a prediction for the atomic op. The control circuit 70 may provide an indication of the prediction (e.g. the atomic forward control, or AFwdCtl, in FIG. 3) to the store queue 32 and may receive an indication of completion (successful or unsuccessful) from the store queue 32 (e.g. the atomic pass/fail (P/F) in FIG. 3). An atomic pass may be a completion that is successful, and an atomic fail may be a completion that is unsuccessful (and forwarded to a subsequent load, in an embodiment).

The register 72 may store a count value (atomic prediction counter, or APCtr, in FIG. 3), and the control circuit 70 may be configured to update the count value based on atomic operations executed in the LSU 42. For example, the control circuit 70 may be configured to increment the count value based on a detection that an atomic operation completed successfully. The control circuit 70 may be configured to decrement the count value based on a detection that the atomic operation completed unsuccessfully and further based on the store queue having forwarded store data (e.g. the second data) to a subsequent load operation. The control circuit 70 may also be configured not to modify the count value based on a detection that the atomic operation completed unsuccessfully and further based on the store queue having not forwarded the second data.

The control circuit 70 may be configured to compare the count value to a threshold value to predict the atomic operation indicated by the atomic op input to the control circuit 70. In the above described embodiment, the control circuit 70 may be configured to compare the count value to a threshold value and to predict a successful completion if the count value is greater than the threshold value (or greater than or equal to). Other embodiments may decrement the count value on successful atomic ops and increment the count value on unsuccessful, the compare may be for the count value to be less than the threshold value (or less than or equal to the threshold value). The threshold value may be fixed or programmable, in various embodiments.

In one embodiment, the count value may be initialized to the maximum value that it can reach, and thus the number of failed atomic ops prior to blocking forwarding may be based on a difference between the maximum value and the threshold value. Accordingly, in cases in which atomic ops that complete unsuccessfully are not common, the store to load forwarding from the store op derived from the atomic op may be unaffected but cases in which completing unsuccessfully is more common may result in forwarding being prevented. Other embodiments may select other initialization values. Additionally, embodiments that decrement based on completion of the atomic operation successfully and increment based on completion of the atomic operation unsuccessfully may initialize the counter to zero or a low value.

Figure 4:
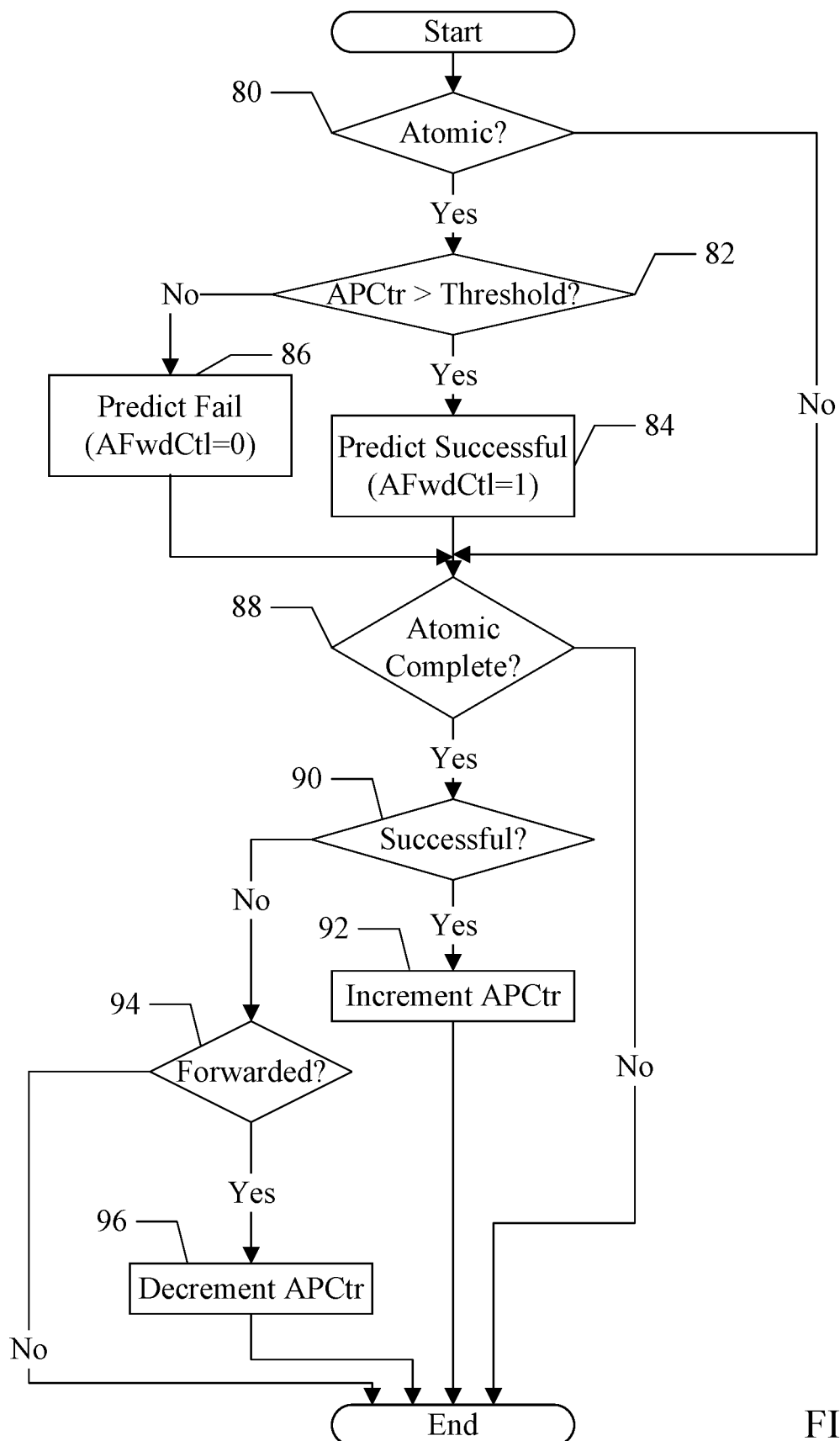
FIG. 4 is a flowchart illustrating operation of one embodiment of the atomic predictor circuit shown in FIG. 3.

FIG. 4 is a flowchart illustrating certain operation of one embodiment of the atomic predictor circuit 36 shown in FIG. 3. While the blocks are shown in a particular order for ease of understanding, other orders may be used. Some blocks or combinations of blocks may be independent of each other and thus may be performed in parallel or in any order. For example, in FIG. 4, the combination of the blocks 88, 90, 92, 94, and 96 may be independent of the combination of the blocks 80, 82, 84, and 86. Blocks may be performed in parallel in combinatorial logic in the control circuit 70. Blocks, combinations of blocks, and/or the flowchart as a whole may be pipelined over multiple clock cycles. The control circuit 70 may be configured to implement the operation shown in FIG. 4.

If the control circuit 70 receives an indication that an atomic op is being executed (decision block 80, "yes" leg) and the APCtr is greater than a threshold amount (decision block 82, "yes" leg), the control circuit 70 may be configured to predict successful for the atomic op (block 84). For example, the control circuit 70 may assert the AFwdCtl (binary 1) to the store queue 32. If the APCtr is less than the threshold (decision block 82, "no" leg), the control circuit 70 may be configured to predict unsuccessful for the atomic op (block 86). For example, the control circuit 70 may deassert (binary 0) the AFwdCtl to the store queue 32. The store queue 32 may store the AFwdCtl value in the store queue 32 with the store op portion of the atomic op. It is noted that, since the implementation illustrated in FIGS. 3-4 is a global counter-based system that is not tied to a particular instance of an atomic op, the control circuit 70 may be configured to implement the output AFwdCtl continuously based on the comparison of the APCtr and the threshold value (e.g. it need not be based on receiving an indication that the atomic op is being executed).

The store queue 32 may also signal when the store portion of atomic ops are completing, and whether the completion is successful or unsuccessful (e.g. AtomicP/F in FIG. 3). If an atomic op is complete (decision block 88, "yes" leg) and is successful (decision block 90, "yes" leg), the control circuit 70 may be configured to increment the APCtr (block 92). If the atomic op completes unsuccessfully and the store op forwarded data to a subsequent load op (decision block 90, "no" leg and decision block 94, "yes" leg), the control circuit 70 may decrement the APCtr (block 96). If the atomic op completes unsuccessfully and the store op did not forward data to a subsequent load op (decision block, 90, "no" leg and decision block 94, "no" leg), the control circuit 70 may be configured not to modify the APCtr. The APCtr may be a saturating counter, saturating at the maximum value for increments and saturating at zero for decrements (e.g. the counter may not overflow or underflow).

Figure 5:
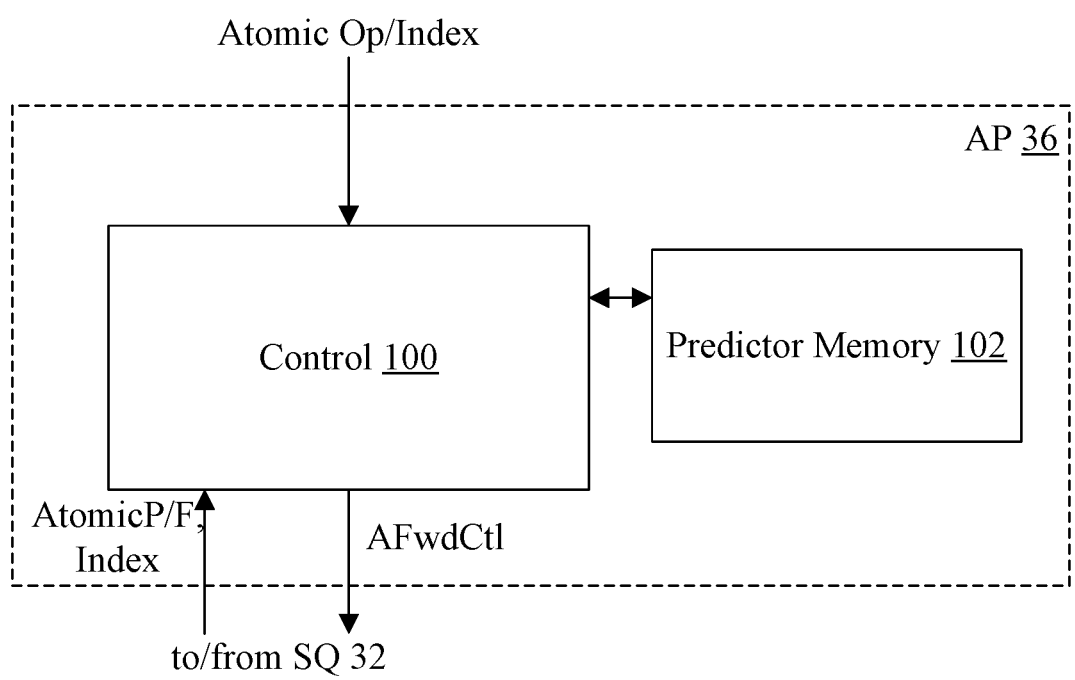
FIG. 5 is a block diagram of another embodiment of an atomic predictor circuit shown in FIG. 1.
Figure 6:
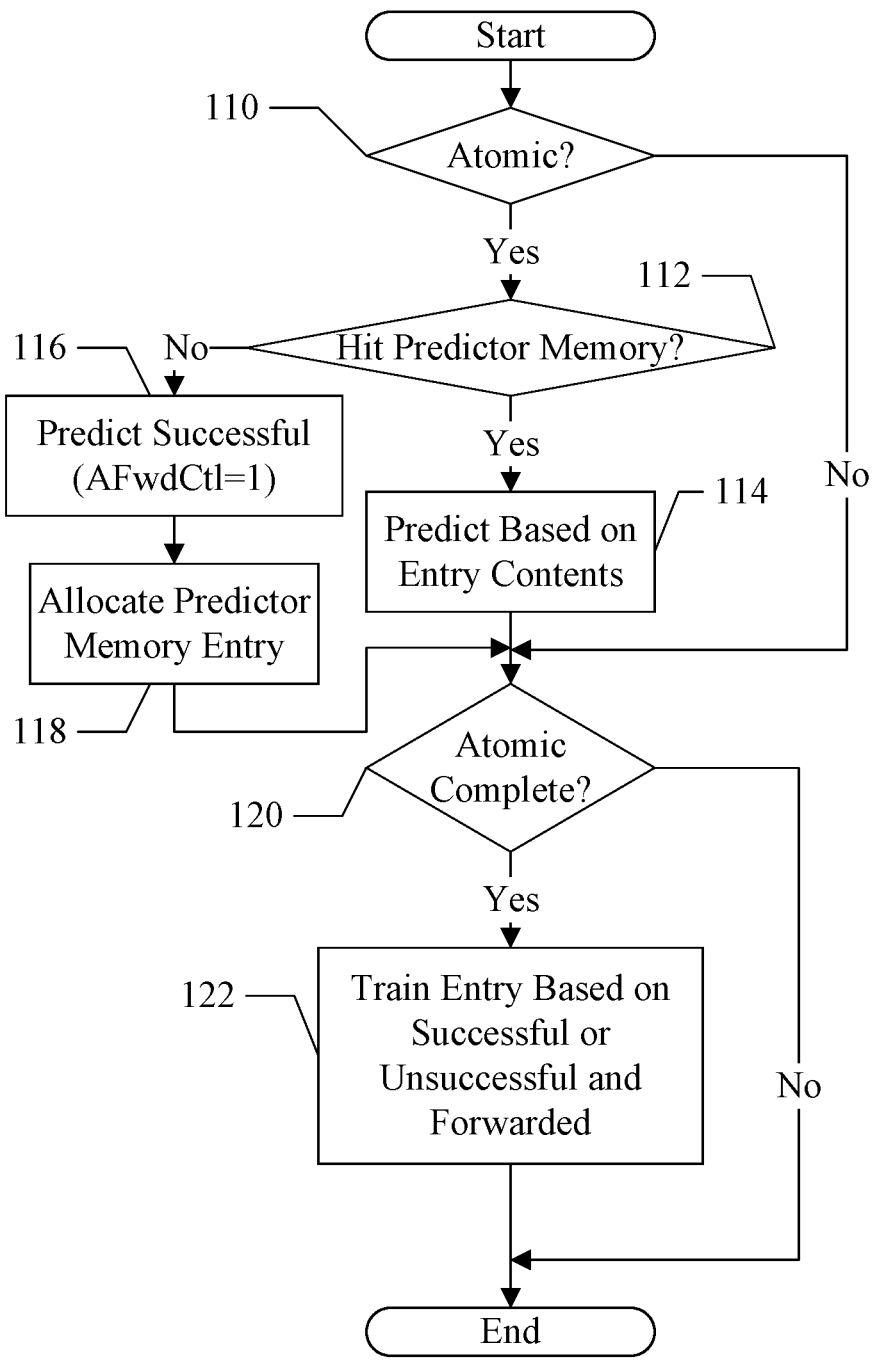
FIG. 6 is a flowchart illustrating operation of one embodiment of the atomic predictor circuit shown in FIG. 5.

The embodiment of FIGS. 3-4 implements a global prediction scheme, tracking results of atomic ops collectively and basing predictions on the collective results. Other embodiments may attempt to tracking separate predictions for atomic ops (although there may some aliasing between instances of atomic ops that map to the same entry in a prediction memory as discussed below). FIGS. 5-6 are an example embodiment of such an implementation.

FIG. 5 is a block diagram of an embodiment of the atomic predictor circuit 36 comprising a control circuit 100 and predictor memory 102 coupled to the control circuit 100. The control circuit 100 is coupled to an indication that an atomic op is being executed (e.g. from the execution circuit 34) along with an index to the predictor memory 102 (or data from which the index may be calculated). For example, a portion of the fetch address of the atomic instruction corresponding to the atomic op may be used as an index, or a portion or all of the fetch address may be hashed to produce the index. Other information from the atomic op maybe used along with or instead of the fetch address to generate the index (hashed or unhashed), as desired. The control circuit 100 may be configured to generate the prediction for the atomic op from data in the predictor memory 102 stored at the index. That is, the predictor memory 100 may comprise a plurality of entries, and an entry may be selected from which to read the prediction or data to use to form the prediction. The control circuit 100 may provide an indication of the prediction (e.g. the atomic forward control, or AFwdCtl, in FIG. 5) to the store queue 32 and may receive an indication of completion (successful or unsuccessful) from the store queue 32 (e.g. the atomic pass/fail (P/F) in FIG. 5). The store queue 32 may also provide the index of the entry used to form the prediction, or the data corresponding to the completing atomic op that is used to generate the index. An atomic pass may be a completion that is successful, and an atomic fail may be a completion that is unsuccessful (and forwarded to a subsequent load, in an embodiment).

As mentioned above, the prediction memory 102 may have a plurality of entries, and a given entry of the plurality of entries may store a prediction value from which the predictor circuit is configured to generate predictions for respective atomic operations. The prediction value may be, e.g. a saturating counter that is incremented for successful atomic operations and decremented for unsuccessful atomic operations (or vice versa). The most significant bit of the counter may be used as a prediction, or the value of the counter may compared to one or more threshold values to determine the predictions. The threshold value may be fixed or programmable, in various embodiments. The control circuit 100 may be configured to select a first entry of the plurality of entries based on the atomic operation and to use a first prediction value in the first entry to generate the prediction for the atomic operation. In some embodiments, the atomic predictor circuit 36 may be a multi-table predictor and multiple entries may be read, from which a prediction value may be selected according to the multi-table selection criteria implemented by the predictor. In some embodiments, the predictor memory 102 may be a set associative memory and tag comparisons may be used to select an entry from the indexed set.

The control circuit 100 may also be configured to select the first entry based on completing the atomic operation, and control circuit 100 may be configured to update the first prediction value based on whether the atomic operation completed successfully or completed unsuccessfully. That is, the control circuit 100 may be configured to update the prediction based on whether the store op is performed or not performed. As mentioned previously, the prediction may be updated in the case that the store op is not performed, and the store data was forwarded for a subsequent load op.

FIG. 6 is a flowchart illustrating certain operation of one embodiment of the atomic predictor circuit 36 shown in FIG. 5. While the blocks are shown in a particular order for ease of understanding, other orders may be used. Some blocks or combinations of blocks may be independent of each other and thus may be performed in parallel or in any order. For example, in FIG. 6, the combination of the blocks 120 and 122 may be independent of the combination of the blocks 110, 112, 114, 116 and 118. Blocks may be performed in parallel in combinatorial logic in the control circuit 100. Blocks, combinations of blocks, and/or the flowchart as a whole may be pipelined over multiple clock cycles. The control circuit 100 may be configured to implement the operation shown in FIG. 6.

If an atomic op is being executed (decision block 110, "yes" leg), the control circuit 100 may form the index or use the received index to read the predictor memory 102. In an embodiment, the entries in the predictor memory 102 may be tagged with information identifying the atomic op assigned to the entry (e.g. a portion of the fetch address not used for the index, information from the atomic op itself such as opcode, operand addresses, etc., etc.) and corresponding information may be compared from the executing atomic op to determine if there is a hit in the entry (decision block 112). In other embodiments, aliasing among atomic ops that index to the same entry is permitted and there is an assumption of a hit in the entry. In either the case of a hit or presumed hit (decision block 112, "yes" leg), the control circuit 100 may be configured to predict the atomic op based on the contents of the entry (block 114). If there is a miss in the entry (decision block 112, "no" leg), the control circuit 110 may be configured to predict that the atomic op will be successful (block 116) and may allocate an entry in the predictor memory 102 for the atomic op (block 118). In an embodiment, the predictor memory 102 may include a plurality of entries at a given index location, and an entry may be allocated based on any selection mechanism (e.g. least recently used (LRU) or an LRU variant, etc.)

If the store queue 32 indicates completion of an atomic operation (decision block 120), the control circuit 100 may be configured to read the entry associated with the completing atomic op and may train the entry based on the "completed successfully" (pass) or "completed unsuccessfully and forwarded to a subsequent load op" (fail) result of the completing atomic op (block 112).

System

Figure 7:
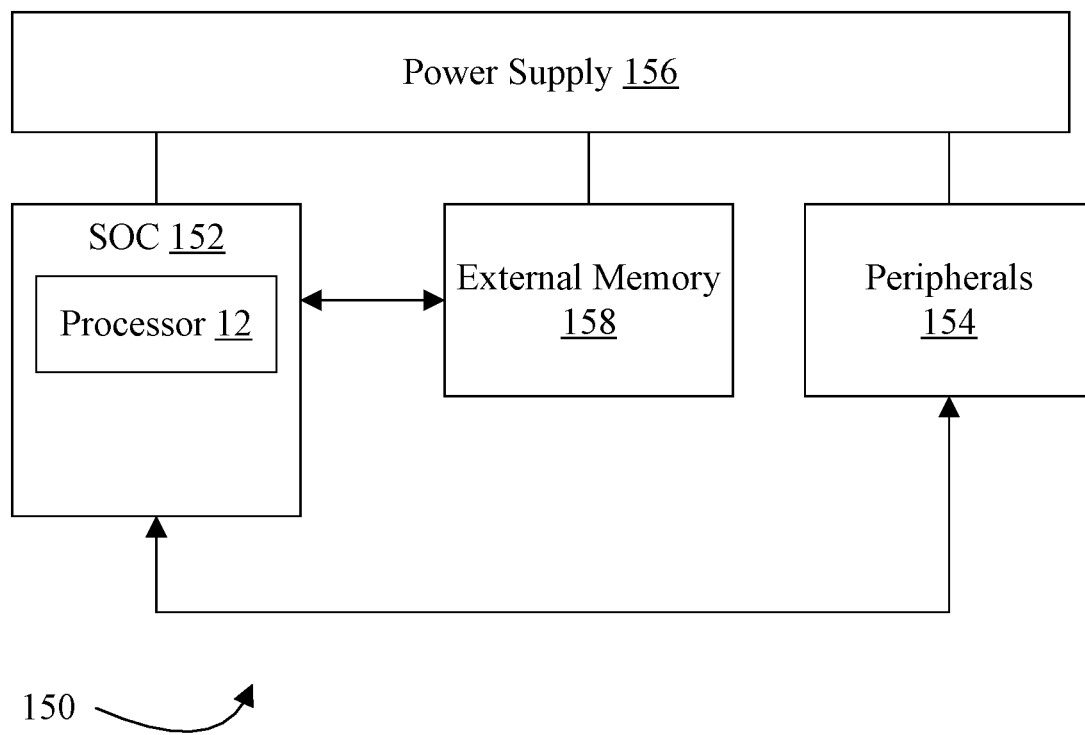
FIG. 7 is a block diagram of one embodiment of a system.

Turning next to FIG. 7, a block diagram of one embodiment of a system 150 is shown. In the illustrated embodiment, the system 150 includes at least one instance of a system on a chip (SOC) 152 coupled to one or more peripherals 154 and an external memory 158. A power supply 156 is provided which supplies the supply voltages to the SOC 152 as well as one or more supply voltages to the memory 158 and/or the peripherals 154. In some embodiments, more than one instance of the SOC 152 may be included (and more than one memory 158 may be included as well). The SOC 152 may include one or more instances of the processor 12 as illustrated in FIG. 1.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as Wi-Fi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 158 may include one or more memory modules to which the memory devices are mounted, such as single inline memory modules (SIMMs), dual inline memory modules (DIMMs), etc. Alternatively, the external memory 158 may include one or more memory devices that are mounted on the SOC 152 in a chip-on-chip or package-on-package implementation.

Computer Readable Storage Medium

Turning now to FIG. 8, a block diagram of one embodiment of a computer readable storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 8 may store a database 204 representative of the SOC 152. Generally, the database 204 may be a database which can be read by a program and used, directly or indirectly, to fabricate the hardware comprising the SOC 152. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 152. The netlist may then be placed and routed to produce a data set describing geometric shapes to be applied to masks. The masks may then be used in various semiconductor fabrication steps to produce a semiconductor circuit or circuits corresponding to the SOC 152. Alternatively, the database 204 on the computer accessible storage medium 200 may be the netlist (with or without the synthesis library) or the data set, as desired.

While the computer accessible storage medium 200 stores a representation of the SOC 152, other embodiments may carry a representation of any portion of the SOC 152, as desired, including the processor 12, any subset of the processor 12 or portions thereof, etc. The database 204 may represent any portion of the above.

Figure 9:
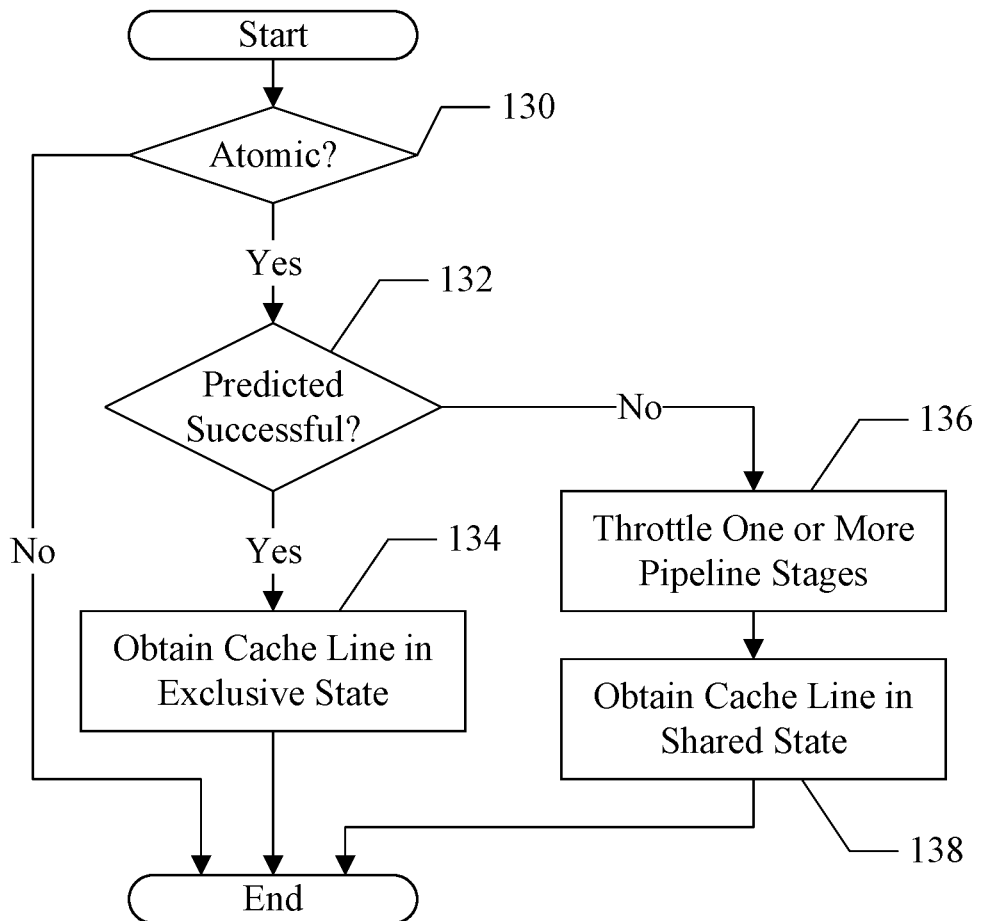
FIG. 9 is a flowchart illustrating certain operations of one embodiment of the processor shown in FIG.1.

FIG. 9 is a flowchart illustrating certain operations of one embodiment of the processor 12 shown in FIG. 1. In the illustrated embodiment, if the processor 12 executes an atomic operation (decision block 130, "yes" leg) and the atomic operation is predicted successful (decision block 132, "yes" leg), the processor 12 may be configured to attempt to obtain a cache line addressed by the atomic operation in the exclusive state in the DCache 16 (block 134). If the processor 12 executes an atomic operation (decision block 130, "yes" leg) and the atomic operation is predicted unsuccessful (decision block 132, "no" leg), the processor 12 may be configured to throttle one or more pipeline stages (block 136). Additionally, if the processor 12 executes an atomic operation (decision block 130, "yes" leg) and the atomic operation is predicted unsuccessful (decision block 132, "no" leg), the processor 12 may be configured to attempt to obtain the cache line addressed by the atomic operation in the shared state in the DCache 16 (block 138).

In accordance with the above description, load/store unit may comprise a predictor circuit and a store queue coupled to the predictor circuit. The predictor circuit may be configured to generate a prediction of whether or not an atomic operation executed by the load/store unit will complete successfully. The atomic operation may specify a load operation from a memory location, a data operation on first data from the load operation, and a store operation to write second data to the memory location, wherein the store operation is conditional on a result of the data operation. The atomic operation may be defined to complete unsuccessfully based on the store operation not being performed. The store queue may be configured to store the store operation and an indication of the prediction from the predictor circuit. The store queue may be configured to forward the second data to a subsequent load operation to the memory location based on the indication indicating a prediction of successful completion by the predictor circuit. The store queue is also configured to prevent forwarding of the second data based on the indication indicating a prediction of unsuccessful completion by the predictor circuit. In an embodiment, the source of the second data is one of an operand of an atomic instruction corresponding to the atomic operation, a predetermined value, or the result of the data operation. In an embodiment, the predictor circuit comprises a register configured to store a count value. The predictor circuit may be configured to update the count value based on atomic operations executed in the load/store unit. The predictor circuit may be configured to increment the count value based on a detection that the atomic operation completed successfully, in an embodiment. The predictor circuit may be configured to decrement the count value based on a detection that the atomic operation completed unsuccessfully and further based on the store queue having forwarded the second data to the subsequent load operation, in an embodiment. In an embodiment, the predictor circuit may be configured not to modify the count value based on a detection that the atomic operation completed unsuccessfully and further based on the store queue having not forwarded the second data. In an embodiment, the predictor circuit is configured to compare the count value to a threshold value to predict the atomic operation. In another embodiment, the predictor circuit comprises a memory having a plurality of entries, and a given entry of the plurality of entries stores a prediction value from which the predictor circuit is configured to generate predictions for respective atomic operations. The predictor circuit may be configured to select a first entry of the plurality of entries based on the atomic operation and to use a first prediction value in the first entry to generate the prediction for the atomic operation. In an embodiment, the predictor circuit is configured to select the first entry based on completing the atomic operation. The predictor circuit may be configured to update the first prediction value based on whether the atomic operation completed successfully or completed unsuccessfully.

In an embodiment, a processor comprises a reservation station coupled to a load/store unit. The reservation station may be configured to issue an atomic operation to be executed, wherein the atomic operation specifies a load operation from a memory location, a data operation on first data from the load operation, and a store operation to conditionally write second data to the memory location based on a result of the data operation. The load/store unit comprises a predictor circuit that may be configured to generate a prediction of whether or not the store operation will write the memory location. The load store unit further comprises a store queue configured to store the store operation, the second data, and an indication of the prediction from the predictor circuit. The wherein the store queue may be configured to forward the second data to a subsequent load operation to the memory location based on a prediction that the store operation will write the memory location. The store queue may be further configured to prevent a forward of the second data based on a prediction that the store operation will not write the memory location. In an embodiment, the load/store unit may be configured to delay the subsequent load operation until at least the store operation is removed from the store queue. In an embodiment, the processor further comprises a data cache. The load/store unit may be configured to forward data from the data cache for the subsequent load operation after the store operation is removed from the store queue. In an embodiment, the predictor circuit comprises a register configured to store a count value. The predictor circuit may be configured to update the count value based on atomic operations executed in the load/store unit and to predict atomic operations based on the count value. In an embodiment, the predictor circuit may configured to compare the count value to a threshold value to predict the atomic operation. In another embodiment, the predictor circuit comprises a memory having a plurality of entries. A given entry of the plurality of entries stores a prediction value from which the predictor circuit is configured to generate predictions for respective atomic operations. The predictor circuit may be configured to select a first entry of the plurality of entries based on the atomic operation and to use a first prediction value in the first entry to generate the prediction for the atomic operation. The predictor circuit may be configured to select the first entry based on a fetch address of the atomic operation. In an embodiment, the predictor circuit may be configured to select the first entry based on detection of a completion of the atomic operation. The predictor circuit may be configured to update the first prediction value based on whether or not the store operation was performed.

In an embodiment, a method may comprise executing an atomic operation in a load/store unit, wherein the atomic operation includes a load operation from a memory location, a data operation preformed on first data read from the memory location, and a store operation to write second data to the memory location based on a result of the data operation; predicting whether or not the store operation will be performed; and selectively forwarding the second data from a store queue based on the predicting. In an embodiment, the method further comprises updating data used to perform the predicting based on whether or not atomicity was maintained.

Numerous variations and modifications will become apparent to those skilled in the art once the above disclosure is fully appreciated. It is intended that the following claims be interpreted to embrace all such variations and modifications.

What is claimed is:

1. A load/store unit comprising:
a predictor circuit configured to generate a prediction of whether or not an atomic operation executed by the load/store unit will complete successfully, wherein the atomic operation specifies a load operation from a memory location, a data operation on first data from the load operation, and a store operation to write second data to the memory location, wherein the store operation is conditional on a result of the data operation, and wherein the atomic operation is defined to complete unsuccessfully based on the store operation not being performed; and
a store queue configured to store the store operation, wherein the store queue is configured to store an indication of the prediction from the predictor circuit with the store operation, and wherein the store queue is configured to forward the second data to a subsequent load operation to the memory location based on the indication indicating a prediction of successful completion by the predictor circuit, and wherein the store queue is configured to prevent forwarding of the second data based on the indication indicating a prediction of unsuccessful completion by the predictor circuit.

2. The load/store unit as recited in claim 1 wherein a source of the second data is one of an operand of an atomic instruction corresponding to the atomic operation, a predetermined value, or the result of the data operation.

3. The load/store unit as recited in claim 1 wherein the predictor circuit comprises a register configured to store a count value, and wherein the predictor circuit is configured to update the count value based on atomic operations executed in the load/store unit.

4. The load/store unit as recited in claim 3 wherein the predictor circuit is configured to increment the count value based on a detection that the atomic operation completed successfully.

5. The load/store unit as recited in claim 3 wherein the predictor circuit is configured to decrement the count value based on a detection that the atomic operation completed unsuccessfully and further based on the store queue having forwarded the second data to the subsequent load operation.

6. The load/store unit as recited in claim 3 wherein the predictor circuit is configured not to modify the count value based on a detection that the atomic operation completed unsuccessfully and further based on the store queue having not forwarded the second data.

7. The load/store unit as recited in claim 3 wherein the predictor circuit is configured to compare the count value to a threshold value to predict the atomic operation.

8. The load/store unit as recited in claim 1 wherein the predictor circuit comprises a memory having a plurality of entries, wherein a given entry of the plurality of entries stores a prediction value from which the predictor circuit is configured to generate predictions for respective atomic operations, wherein the predictor circuit is configured to select a first entry of the plurality of entries based on the atomic operation and to use a first prediction value in the first entry to generate the prediction for the atomic operation.

9. The load/store unit as recited in claim 8 wherein the predictor circuit is configured to select the first entry based on completing the atomic operation, and wherein the predictor circuit is configured to update the first prediction value based on whether the atomic operation completed successfully or completed unsuccessfully.

10. A processor comprising:
a reservation station configured to issue an atomic operation to be executed, wherein the atomic operation specifies a load operation from a memory location, a data operation on first data from the load operation, and a store operation to conditionally write second data to the memory location based on a result of the data operation; and
a load/store unit coupled to the reservation station, wherein the load/store unit comprises a predictor circuit configured to generate a prediction of whether or not the store operation will write the memory location, and wherein the load/store unit further comprises a store queue configured to store the store operation, the second data, and an indication of the prediction from the predictor circuit, wherein the store queue is configured to forward the second data to a subsequent load operation to the memory location based on a prediction that the store operation will write the memory location.

11. The processor as recited in claim 10 wherein the store queue is further configured to prevent a forward of the second data based on a prediction that the store operation will not write the memory location.

12. The processor as recited in claim 11 wherein the load/store unit is configured to delay the subsequent load operation until at least the store operation is removed from the store queue.

13. The processor as recited in claim 12 further comprising a data cache, wherein the load/store unit is configured to forward data from the data cache for the subsequent load operation after the store operation is removed from the store queue.

14. The processor as recited in claim 11 further comprising a data cache, wherein the load/store unit is configured to forward data from the data cache for the subsequent load operation prior to a removal of the store operation from the store queue based on the prediction that the store operation will not write the memory location.

15. The processor as recited in claim 10 wherein the predictor circuit comprises a register configured to store a count value, and wherein the predictor circuit is configured to update the count value based on atomic operations executed in the load/store unit and to predict atomic operations based on a comparison of the count value to a threshold value to predict the atomic operation.

16. The processor as recited in claim 10 further comprising a data cache, wherein the processor is configured to obtain an exclusive state for a cache line including the memory location based on the prediction that the store operation will write the memory location, and wherein the processor is configured to obtain a shared state for the cache line based on a prediction that the store operation will not write the memory location.

17. The processor as recited in claim 10 wherein the processor is configured to throttle one or more pipeline stages of the processor responsive to a prediction that the store operation will not write the memory location.

18. The processor as recited in claim 10 further comprising a branch prediction unit, wherein the branch prediction unit is configured to use a prediction that the store operation will not write the memory location in a subsequent branch prediction.

19. A method comprising:
executing an atomic operation in a load/store unit, wherein the atomic operation includes a load operation from a memory location, a data operation preformed on first data read from the memory location, and a store operation to write second data to the memory location based on a result of the data operation;
predicting whether or not the store operation will be performed; and
selectively forwarding the second data from a store queue based on the predicting.

20. The method as recited in claim 19 further comprising updating data used to perform the predicting based on whether or not atomicity was maintained.

* * * * *